United States Patent
Bannai et al.

(10) Patent No.: US 7,045,248 B2
(45) Date of Patent: May 16, 2006

(54) SECONDARY BATTERY HAVING RADICAL COMPOUND ELECTRODE

(75) Inventors: Yutaka Bannai, Tokyo (JP); Kentaro Nakahara, Tokyo (JP); Yukiko Morioka, Tokyo (JP); Shigeyuki Iwasa, Tokyo (JP); Masaharu Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 571 days.

(21) Appl. No.: 09/963,530

(22) Filed: Sep. 27, 2001

(65) Prior Publication Data

US 2002/0041995 A1   Apr. 11, 2002

(30) Foreign Application Priority Data

Oct. 2, 2000   (JP) .............................. 2000-302669

(51) Int. Cl.
 *H01M 4/60* (2006.01)
(52) U.S. Cl. ..................................................... 429/213
(58) Field of Classification Search ................ 429/212, 429/213, 218.1
See application file for complete search history.

(56) References Cited

U.S. PATENT DOCUMENTS

| 4,397,922 | A | * | 8/1983 | Pokhodenko et al. ....... 429/105 |
| 4,442,187 | A | | 4/1984 | MacDiarmid et al. |
| 4,833,048 | A | | 5/1989 | Dejonghe et al. |
| 5,516,598 | A | * | 5/1996 | Visco et al. .................. 429/42 |
| 2003/0096165 | A1 | * | 5/2003 | Nakahara et al. ........... 429/213 |

FOREIGN PATENT DOCUMENTS

| JP | 58-64774 | 4/1983 |
| JP | 59-196570 | 11/1984 |
| JP | 59-196572 | 11/1984 |
| JP | 01-154462 | 6/1989 |
| JP | 07-037590 | 2/1995 |
| JP | 2715778 | 11/1997 |
| JP | 2002-113847 | 4/2002 |

* cited by examiner

*Primary Examiner*—Jonathan Crepeau
(74) *Attorney, Agent, or Firm*—McGinn IP Law Group, PLLC

(57) ABSTRACT

In a secondary battery comprising a positive electrode, a negative electrode and an electrolyte therebetween, active material of one of the positive electrode and the negative electrode includes a compound having boron radicals or sulfur radicals.

10 Claims, 2 Drawing Sheets

SECONDARY BATTERY HAVING RADICAL COMPOUND ELECTRODE

BACKGROUND OF THE INVENTION

1. Field of the Invention

The present invention relates to a lightweight secondary battery with a high energy density.

2. Description of the Related Art

As note-type personal computers, portable telephone sets and portable terminals have been remarkably developed, lighter secondary batteries with a higher energy density are highly required.

A first prior art secondary battery is a lithium ion battery formed by a positive electrode active including lithium transition metal oxide such as $LiCoO_2$ and $LiMn_2O_4$ as active material, a negative electrode including carbon as active material, and an electrolyte. In the first prior art secondary battery, a charging and discharging operation is carried out by absorbing lithium ions from one of the active materials into the other and expelling lithium ions vice versa.

In the above-described first prior art secondary battery, however, since use is made of heavyweight lithium transition metal oxide as active material of the positive electrode, the energy density is about 150 mAh/g, and is insufficient.

A second prior art secondary battery is a metal-sulfur type battery formed by a positive electrode including an organic compound having a sulfur-sulfur bond as active material (see: U.S. Pat. No. 4,833,048 and JP-A-74459). In the second prior art secondary battery, a charging and discharging operation is carried out by an electrolytic reduction to form a sulfur metallic ion bond or a sulfur-proton bond and an electrolytic oxidation to form a sulfur-sulfur bond. Since the positive electrode is mainly constructed by lightweight atoms such as sulfur and carbon, the energy density is about 330 mAh/g when the organic compound is 2,5-dimercapto-1,3,4-thiadiazole (DMcT), and therefore, is relatively high.

In the above-described second prior art secondary battery, however, the efficiency of recombination of the cleaved bonds is low, and also, the stability is low.

A third prior art secondary battery is a polymer battery having one or two electrodes including conductive polymers (see: U.S. Pat. No. 4,442,187). In the third prior art secondary battery, a charging and discharging operation is carried out by a doping reaction for doping electrolytic ions into the conductive polymer and an undoping reaction for undoping electrolytic ions from the conductive polymer. In more detail, in the doping reaction, exytons such as charged solitons and polarons generated through electrolytic oxidation and reduction are stabilized by paired ions. On the other hand, in the undoping reaction, the stabilized exytons are electrochemically reduced or oxidized. Since the positive and/or negative electrode is also mainly constructed by lightweight atoms such as carbon and nitrogen, the energy density is relatively high.

In the third prior art secondary battery, however, since the exytons generated through oxidation and reduction are non-localized in a broad π-electron conjugated region, so that the exytons interface with each other, there is a limit in the concentration of exytons, which invites a limit of the energy density.

SUMMARY OF THE INVENTION

It is an object of the present invention to provide a highly-stable secondary battery with a high energy density.

According to the present invention, in a secondary battery comprising a positive electrode, a negative electrode and an electrolyte, active material of one of the positive electrode and the negative electrode includes a compound having boron radicals or sulfur radicals.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

Figure 1:
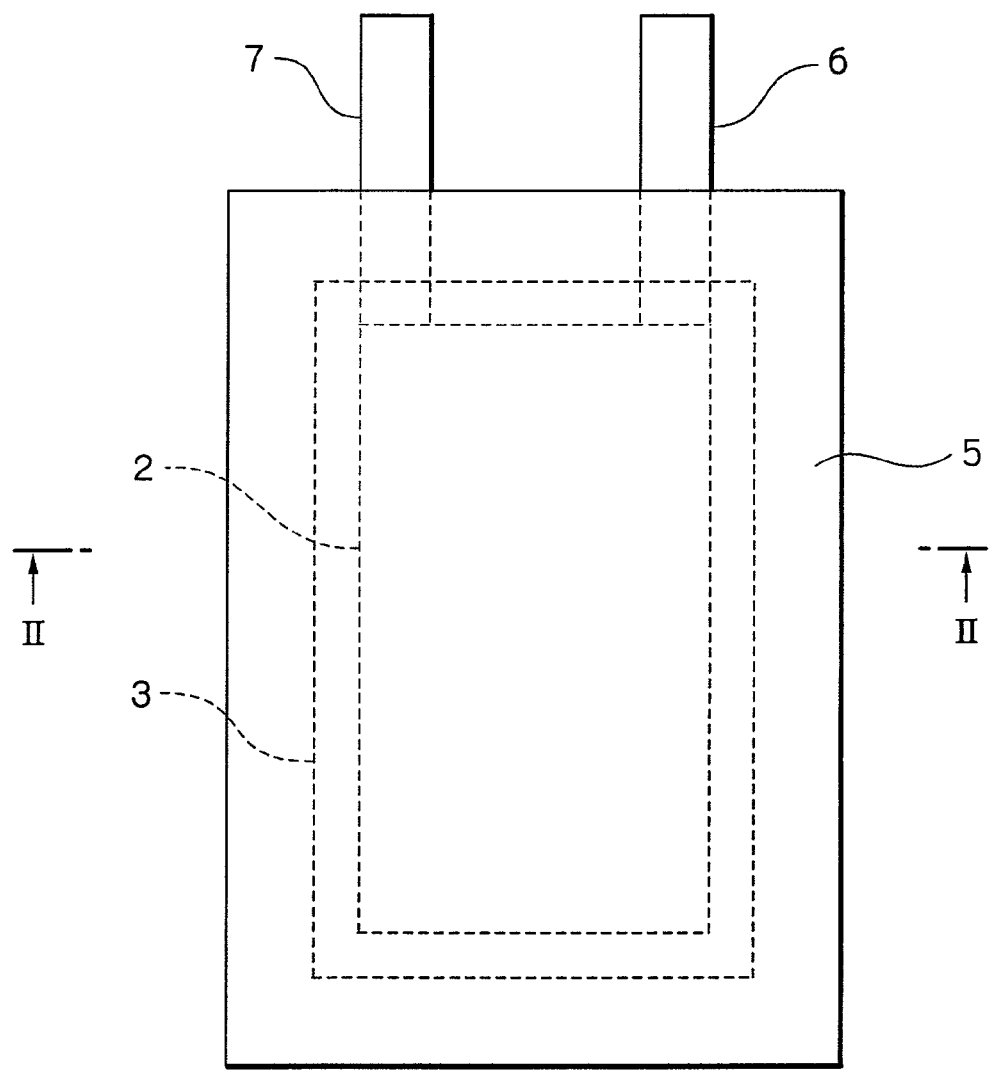
FIG. 1 is a plan view illustrating an embodiment of the secondary battery according to the present invention.
Figure 2:
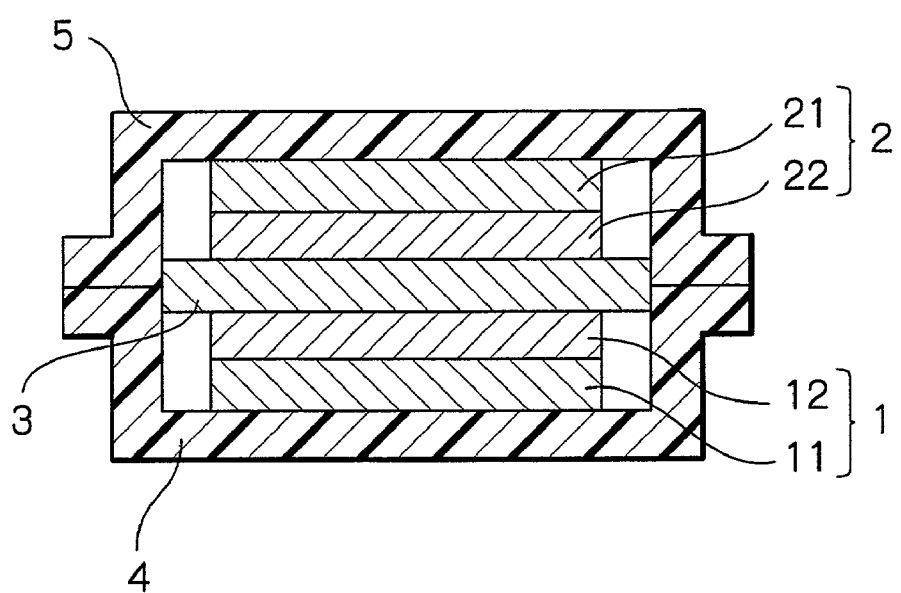
FIG. 2 is a cross-sectional view taken along the line II—II of FIG. 1.

FIG. 1 is a plan view illustrating an embodiment of the secondary battery according to the present invention, and FIG. 2 is a cross-sectional view taken along the line II—II of FIG. 1.

In FIGS. 1 and 2, a secondary battery is constructed by a positive electrode 1 formed by a positive electrode current collector 11 and a positive electrode active material layer 12, a negative electrode 2 formed by a negative electrode current collector 21 and a negative electrode active material layer 22, and a separator 3 sandwiched by the positive electrode 1 and the negative electrode 2. The positive electrode 1, the negative electrode 2 and the separator 3 are sealed by envelopes 4 and 5. In this case, a positive electrode terminal 6 and a negative electrode terminal 7 are connected through the envelopes 4 and 5 to the positive electrode current collector 11 and the negative electrode current collector 21, respectively.

Generally, if one of the active material layers 12 and 22 has the following two states:

i) a starting state; and ii) an electrolytic oxidation state. Also, the other of the active material layers 11 and 12 has the following two states:

i) a starting slate; and ii) an electrolytic reduction state.

In the present invention, one of the positive electrode active material layer 12 and the negative electrode active material layer 22 is made of a compound having boron radicals or sulfur radicals. In more detail, the one of the positive electrode active material layer 12 and the negative electrode active material layer 22 has boron radicals in a starting state, in an electrolytic oxidation state or in an electrolytic reduction state. As a result, a charging and discharging operation is carried out by a transition of the one of the active material layers 12 and 22 from a radical state to an ion state and vice versa, to absorb and expel electrons.

Note that a boron radical is a boron atom having an unpaired electron, and a sulfur radical is a sulfur atom having an unpaired electron.

Generally, it is statistic-mechanically considered that any compound has certain unstable radicals whose concentration is about $10^{16}$ spins/g at room temperature. In this case, since radicals are so reactive to interfere with their surrounding material, radicals extinguish in a short time. On the other hand, some radicals are stabilized by a resonance effect, a steric hindrance and/or a solvent effect. Stable radicals have about $10^{19}$ to $10^{23}$ spins/g for a long time.

The inventors have found that a compound having boron radicals or sulfur radicals are highly stable.

The compound having boron radicals according to the present invention is preferably a compound having aromatic and/or alkyl groups such as

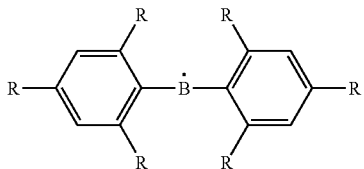

where each R represents one of a hydrogen atom, a substituted hydrocarbon group and a non-substituted hydrocarbon group. Also, the compound is preferably dimethyl boron radical represented by the following structural formula:

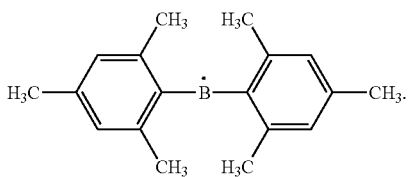

The compound having sulfur radicals according to the present invention is preferably a compound having heterocyclic groups combined including sulfur radicals such as thianthrene represented by the following structural formula:

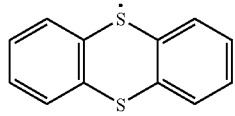

Also, the compound is preferably a compound having aromatic groups combined with sulfur radicals such as p-bis(methylthio) benzene represented by the following structural formula:

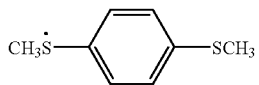

Note that a compound having aliphatic or aromatic groups with sulfur-sulfur bonds is not preferable in stability, since sulfur atoms due to the cleavage and recombination of the sulfur-sulfur bonds are diffused to reduce the cyclic characteristics.

The radical compound used as active material of the electrodes according to the present invention is not limited to the above-mentioned radical compounds; however, if the radical compound is used in a solid state, it should be hardly-soluble or insoluble in electrolyte, in order to suppress the reduction of the capacity of the battery. Also, the molecular weight of the radical compound according to the present invention is not limited to a specific value. Further, the radical compound according to the present invention can be formed by two different radical compounds or combined with other non-radical compounds.

If the negative electrode active material layer 22 is made of the radical compound according to the present invention, the positive electrode active material layer 12 is made of a transition metal oxide, a sulfur-sulfur bond including compound and a conductive polymer compound, individually or in combination. For example, the transition metal oxide is lithium-manganese oxide such as $LiMnO_2$, lithium-manganese oxide having a spinel structure such as $Li_xMn_2O_4$ (0<x<2), and $MnO_2$, $LiCoO_2$, $LiNiO_2$ or $Li_xV_2O_5$ (0<x<2). Also, the sulfur-sulfur bond including compound is dithioglycol, 2,5-dimercapto-1,3,4-thiadiazol, or S-triazine-2,4,6-trithiol. Further, the conductive polymer compound is polyacetylene, polyphenylene, polyaniline or polypyrrole.

On the other hand, if the positive electrode active material layer 12 is made of the radical compound according to the present invention, the negative electrode active material layer 22 is made of carbon material such as graphite or amorphous carbon for absorbing and expelling lithium ions, metal material such as lithium metal or lithium alloy, or organic compound such as conductive polymer. The shape of the negative electrode active material layer 22 can be of any type. For example, the negative electrode active material layer 22 made of lithium metal is of a thin film type, of a bulk type, of a fiber type, of a flake type or of a powder type.

In view of the energy density, the radical compound according to the present invention is preferably used as the negative electrode active material layer 12.

Also, in view of the stability characteristics, it is preferable that an electrolytic reaction at the positive electrode 1 during a discharging mode be an electrolytic reaction of the radical compound according to the present invention. Further, the radical compound according to the present invention may react with the cations of electrolyte salt, which further improves the stability characteristics.

In the present invention, when the active material layer 12 or 22 made of the radical compound according to the present invention is formed on the current collector 11 or 21, the active material layer 12 or 22 is combined with conductivity enhancing material or ion conductivity enhancing material, in order to reduce the impedance of the battery. For example, the conductivity enhancing material is formed by carbon fine particles made of graphite, carbon black or acetylene black, or conductive polymer such as polyaniline, polypyrrole, polythiophene, polyacetylene or polyacene. Also, the ion conductivity enhancing material is a polymer gel electrolyte or a polymer solid electrolyte.

Additionally, in order to enhance the binding force of the active material layer 12 or 22 made of the radical compound according to the present invention, a binder is mixed thereinto. For example, the binder is made of polyvinylidene fluoride, vinylidene fluoride-hexafluoropropylence copolymer, vinylidene fluoride-tetrafluoroethylene copolymer, styrene-butadiene copolymer rubber, polypropylene, polyethylene, polyimide or various polyurethanes.

Further, in order to enhance the oxidation/reduction reaction, a catalyst can be introduced into the active material layer 12 or 22 made of the radical compound according to the present invention. For example, the catalyst is made of a conductive polymer compound such as polyaniline, polypyrrole, polythiophene, polyacetylene or polyacene, a basic compound such as pyridine derivative, pyrrolidone derivative, benzimidazole derivative, benzothiazole derivative or acridine derivative. or metal ion complex.

The current collectors 11 and 21 are made of metal such as nickel, aluminum, aluminum alloy, copper, silver, gold or stainless steel, or carbon material. Also, the current collectors 11 and 21 can be of a foil type, of a plate type or of a mesh type. Further, a catalyst effect can be introduced into the current collectors 11 and 21. Additionally, the active material layers 12 and 22 can be chemically bonded to the current collectors 11 and 21, respectively.

The separator 3 can be made of porous film to prevent the active material layers 12 and 22 from contacting each other.

The electrolyte of the separator 3 serves as means for transferring charges between the electrodes 1 and 2. The electrolyte is composed of solvent and electrolyte salt therein. For example, the electrolyte salt is a metal salt or lithium salt such as $LiClO_4$, $LiPF_6$, $LiBF_4$, $LiCF_3SO_3$, $Li(CF_3SO_2)_2$, $LiN(C_2F_5SO_2)_2$, $LiC(CF_3SO_2)_3$ or $LiC(C_2F_5SO_2)$. Also, the solvent is an organic solvent such as ethylene carbonate, propylene carbonate, dimethyl carbonate, diethyl carbonate, methyl ethyl carbonate, γ-butyrolactone, tetrahydrofuran, dioxolane, sulfolane, dimethylformamide, dimethylacetamide, and N-methyl-2-pyrrolidone individually or in combination.

Also, the above-mentioned electrolyte is composed of a polymer electrolyte individually or in a gelled state. For example, the polymer electrolyte is a vinylidene fluoride compound such as polyvinylidene fluoride, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, vinylidene fluoride-hexafluoropropylene copolymer or vinylidene fluoride-hexafluoropropylene-tetrafluoroethylene terpolymer, an acrylonitrile polymer compound such as acrylonitrile-methylmethacrylate copolymer, acrylonitrile-ethylmethacrylate copolymer, acrylonitrile-methylacrylate copolymer, acrylonitrile-ethylacrylate copolymer, acrylonitrile-methacrylate copolymer, acrylonitrile-acrylate copolymer, or acrylonitrile-vinylacetato copolymer, or a polymer compound such as polyethylene oxide or ethylene oxide-propylene oxide copolymer, or their acrylate copolymer or methacrylate polymer.

The envelopes 4 and 5 are made of metal, resin or laminated films composed of metal foils resin films. Also, the envelopes 4 and 5 are cylindrical, rectangular, coin-shaped or sheet-shaped.

The method for manufacturing the secondary battery of FIGS. 1 and 2 will be explained below.

First, a positive electrode current collector 11 combined with a positive electrode terminal 6 and a negative electrode current 21 combined with a negative electrode terminal 7 are prepared.

Next, active material including conductivity enhancing material, catalysts and binders is coated on the positive electrode current collector 11 and the negative electrode current collector 21, to form a positive electride active material layer 12 and a negative electrode active material layer 22, thus completing a positive electrode 1 and a negative electrode 2.

Next, a separator 3 is prepared and is sandwiched by the positive electrode 1 and the negative electrode 2.

Next, the positive electrode 1, the negative electrode 2 and the separator 3 are sealed by envelopes 4 and 5.

Finally, electrolytic solution is injected into a gap within the envelopes 4 and 5, to complete the secondary battery of FIGS. 1 and 2.

In the above-described manufacturing method, the active material of one of the active material layers 12 and 22 includes a compound having boron radicals or sulfur radicals in a starting state. Otherwise, during an electrolytic reaction after the secondary battery is completed, the active material of the one of the active material layers 12 and 22 includes boron radicals or sulfur radicals. In other words, the active material of the one of the active material layers 12 and 22 has boron radicals or sulfur radicals in an electrolytic reduction state or in an electrolytic oxidation state.

EXAMPLE 1

First, in an argon gas-atmosphere globe box, dimethoxyethane solution including dimesityl boron radicals is mixed with graphite powder as conductivity enhancing material, where the weight ratio of the radical compound to the graphite powder is 2:1. Then, this mixture is coated on a current collector combined with an electrode terminal. Then, the dimethoxyethane is dried and removed, to complete an electrode.

On the other hand, a vinylidene fluoride-hexafluoropropylene copolymer is dissolved in tetrahydrofuran. Then, this solution is mixed with ethylene carbonate-propylene carbonate mixture solution including $LiPF_6$ (1 mol/l) where the weight ratio of the copolymer to the carbonate mixture solution is 2:1. Then, this mixture is coated on a glass substrate. Then, the tetrahydrofuran is dried and removed, to complete a polymer electrolyte.

Finally, the polymer electrolyte is sandwiched by the above-dimensioned electrode and another lithium electrode, and is sealed by envelopes, to complete a secondary battery.

In this secondary battery, the electrode including boron radicals serves as a positive electrode, while the lithium electrode serves as a negative electrode. The inventors have confirmed that 10 cycles of charging and discharging operations were carried out under the condition that a current density is 0.1 $mA/cm^2$. Also, the inventors have confirmed that the spin concentration of the dimethoxyethane solution including dimesityl boron radicals was stably higher than $10^{21}$ spins/g by observing an electron-spin resonance spectrum. Further, the theoretical energy density of the radical compound was 110 mAh/g.

EXAMPLE 2

First, in an argon gas-atmosphere globe box, acetonitrile solution including p-bis(methylthio) benzene radicals is mixed with graphite powder as conductivity enhancing material, where the weight ratio of the radical compound to the graphite powder is 2:1. Then, this mixture is coated on a current collector combined with an electrode terminal. Then, the acetonitrile is dried and removed, to complete an electrode.

On the other hand, a vinylidene fluoride-hexafluoropropylene copolymer is dissolved in tetrahydrofuran. Then, this solution is mixed with ethylene carbonate-propylene carbonate mixture solution including $LiPF_6$ (1 mol/l), where the weight ratio of the copolymer to the carbonate mixture solution is 2:1. Then, this mixture is coated on a glass substrate. Then, the tetrahydrofuran is dried and removed, to complete a polymer electrolyte.

Finally, the polymer electrolyte is sandwiched by the above-dimensioned electrode and another lithium electrode, and is sealed by envelopes, to complete a secondary battery.

In this secondary battery, the electrode including sulfur radicals serves as a positive electrode, while the lithium electrode serves as a negative electrode. The inventors have confirmed that 10 cycles of charging and discharging operations were carried out under the condition that a current density is 0.1 $mA/cm^2$. Also, the inventors have confirmed that the spin concentration of the acetonitrile solution including p-bis(methylthio) benzen radicals was stably higher than $10^{21}$ spins/g by observing an electron-spin resonance spectrum. Further, the theoretical energy density of the radical compound was 160 mAh/g.

As explained hereinabove, according to the present invention, the secondary battery according to the present invention can be highly stabilized while the energy density is high.

The invention claimed is:
1. A secondary battery comprising:
a positive electrode;
a negative electrode; and
an electrolyte disposed between said positive electrode and said negative electrode, wherein an active material of one of said positive electrode and said negative electrode comprises a compound having boron radicals, and
wherein said compound having said boron radicals is represented by the following structural formula:

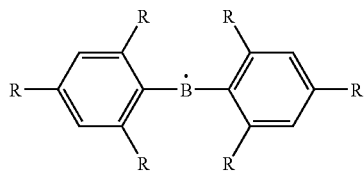

wherein each R represents one of a hydrogen atom, a substituted hydrocarbon group and a non-substituted hydrocarbon group.

2. A secondary battery comprising:
a positive electrode;
a negative electrode; and
an electrolyte disposed between said positive electrode and said negative electrode, wherein active material of one of said positive electrode and said negative electrode comprises a compound having boron radicals,
wherein an active material of the other one of said positive electrode and said negative electrode comprises one of a transition metal oxide, a compound having a sulfur-sulfur bond and a conductive polymer compound, and
wherein said compound has a spin concentration of higher than $10^{21}$ spins/g,
wherein said compound having said boron radicals comprises at least one of an aromatic group and an alkyl group combined with said boron radicals, and
wherein said compound having said boron radicals is represented by the following structural formula:

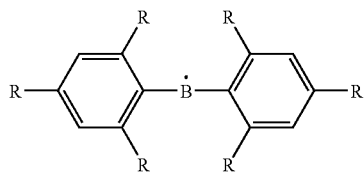

wherein each R represents one of a hydrogen atom, a substituted hydrocarbon group and a non-substituted hydrocarbon group.

3. A secondary battery comprising:
a positive electrode;
a negative electrode; and
an electrolyte disposed between said positive electrode and said negative electrode,
wherein an active material of one of said positive electrode and said negative electrode comprises a compound having boron radicals,
wherein an active material of the other one of said positive electrode and said negative electrode comprises one of a transition metal oxide, a compound having a sulfur-sulfur bond and a conductive polymer compound, and
wherein said compound has a spin concentration of higher than $10^{21}$ spins/g.
wherein said compound having said boron radicals comprises at least one of an aromatic group and an alkyl group combined with said boron radicals, and
wherein said compound having said boron radicals is represented by the following structural formula:

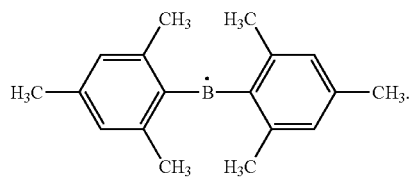

4. A secondary battery comprising:
a positive electrode;
a negative electrode; and
an electrolyte disposed between said positive and said negative electrode,
wherein an active material of one of said positive electrode and said negative electrode comprises a compound represented by the following structural formula:

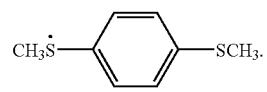

5. The secondary battery as set forth in claim 4, wherein said compound has a spin concentration of higher than $10^{21}$ spins/g.

6. The secondary battery as set forth in claim 4, wherein said compound comprises two different radical compounds.

7. The secondary battery as set forth in claim 4, wherein said compound is combined with a non-radical compound.

8. The secondary battery as set forth in claim 4, wherein said active material of said negative electrode comprises said compound, and
where said active material of said positive electrode comprises one of a transition metal oxide, a compound having a sulfur-sulfur bond and a conductive polymer compound.

9. The secondary battery as set forth in claim 4, wherein said active material of said positive electrode comprises said compound, and
where said active material of said negative electrode comprises one of a transition metal oxide, a compound having a sulfur-sulfur bond and a conductive polymer compound.

10. A secondary battery comprising:
a positive electrode;
a negative electrode; and
an electrolyte disposed between said positive electrode and said negative electrode,
wherein active material of one of said positive electrode and said negative electrode comprises a compound having boron radicals, and
wherein said compound is represented by the following structural formula:

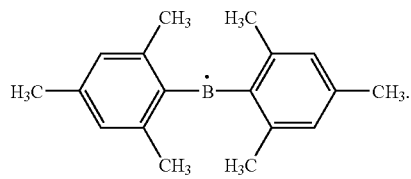

* * * * *